(12) United States Patent
Chen et al.

(10) Patent No.: US 10,147,226 B1
(45) Date of Patent: Dec. 4, 2018

(54) 2D MOTION VECTORS FROM 3D MODEL DATA

(71) Applicant: PIXELWORKS, INC., Portland, OR (US)

(72) Inventors: Songsong Chen, Shanghai (CN); Bob Zhang, Santa Clara, CA (US); Neil Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 121 days.

(21) Appl. No.: 15/064,201

(22) Filed: Mar. 8, 2016

(51) Int. Cl.
*G06T 15/80* (2011.01)
*G06T 1/20* (2006.01)
*G06T 3/00* (2006.01)
*G06T 15/04* (2011.01)

(52) U.S. Cl.
CPC ............... *G06T 15/80* (2013.01); *G06T 1/20* (2013.01); *G06T 3/0031* (2013.01); *G06T 15/04* (2013.01)

(58) Field of Classification Search
USPC .................................................. 345/426, 419
See application file for complete search history.

(56) References Cited

U.S. PATENT DOCUMENTS

| | | | | |
|---|---|---|---|---|
| 7,447,337 B2* | 11/2008 | Zhang | ................ | G06K 9/00711 348/699 |
| 7,508,990 B2* | 3/2009 | Pace | .................. | G06K 9/00711 382/103 |
| 7,646,817 B2* | 1/2010 | Shen | .................... | H04N 19/159 375/240.25 |
| 7,990,389 B2* | 8/2011 | Barone | ................. | G06T 15/005 345/474 |
| 9,652,886 B2* | 5/2017 | Ota | .......................... | G06T 15/20 |
| 2003/0229719 A1* | 12/2003 | Iwata | ..................... | H04N 19/51 709/247 |
| 2005/0030316 A1* | 2/2005 | Sirtori | ................... | G06T 15/005 345/546 |
| 2012/0229460 A1* | 9/2012 | Fortin | ....................... | G06T 1/20 345/419 |
| 2012/0307004 A1* | 12/2012 | Budagavi | .............. | G06T 15/506 348/42 |
| 2015/0379763 A1* | 12/2015 | Liktor | ..................... | G06T 15/80 345/426 |
| 2017/0083762 A1* | 3/2017 | Segalovitz | ......... | G06K 9/00442 |
| 2017/0091894 A1* | 3/2017 | Eldar | ..................... | G06T 1/0007 |
| 2017/0148186 A1* | 5/2017 | Holzer | ..................... | G06T 7/70 |
| 2017/0148199 A1* | 5/2017 | Holzer | .................... | G06T 11/60 |
| 2017/0161940 A1* | 6/2017 | Liktor | .................... | G09G 5/363 |

OTHER PUBLICATIONS

Kimata et al. "3D Motion Vector Coding with Block base Adaptive Interpolation filter on H.264". IEEE 2003.*

* cited by examiner

*Primary Examiner* — Kimbinh T Nguyen
(74) *Attorney, Agent, or Firm* — Miller Nash Graham & Dunn LLP

(57) ABSTRACT

A method of converting three dimensional image data into two dimensional image data, includes identifying at least two vertices of an object to be rendered in a frame of three dimensional image data, calculating a three-dimensional (3D) motion vector for each vertex of the object to be rendered, determining a position of each vertex in a new frame, calculating the motion vectors for a block based upon the vertex position in the new frame and the motion vectors for the vertex, and using the motion vectors for the vertex to render pixels in the new frame.

11 Claims, 15 Drawing Sheets

2D MOTION VECTORS FROM 3D MODEL DATA

BACKGROUND

Three dimensional (3D) content may need to be converted in order to be displayed on two dimensional (2D) screens. Rendering from either 2D to 3D or the other way around requires a rather heavy processing load. In addition, displaying dynamic information may require smooth update rates. This may include tasks as common to scrolling through a text window or as specific as updating the scenes in a racing simulation. Often a difficult choice exists between a consistent look and the fastest possible frame rate. This often results in the graphics processing unit (GPU) becoming the most expensive part of a system on a chip (SoC). In addition, high frame rate requirements can raise the power consumption reducing the battery life of portable electronics.

Currently available designs typically optimize in the GPU at the intraframe level to speed up performance. Optimizations include removing overdraw. For example, in a complicated scene many of the objects are occluded or hidden from view. When the process does not execute the fragment shader for these pixels, it can provide significant savings in computing resources and power. A fragment shader produces color and attributes of each fragment, in many cases the fragment consists of a pixel. The power and computing resources are reduced by not rendering the pixels that are occluded.

These intraframe processes do not generally take into account savings available in the time domain, or in an inter-frame manner.

DETAILED DESCRIPTION OF THE EMBODIMENTS

The embodiments discussed here generally reduce the burden on the graphics processing unit (GPU). Generally, a display processor has the capability to hold one or two frames and utilize motion vectors to reconstruct at least a part of a frame. A GPU coprocessor could intercept the graphics application programming interface (API) call and generate the motion vector needed by the display processor. The display processor and the coprocessor may work together to reduce the burden on the GPU or the GPU may be configured differently to eliminate the need for a coprocessor.

In this discussion, the term GPU coprocessor will be referred to either an actual GPU coprocessor, or a GPU that has been adapted by either changes to the software or hardware to perform the tasks that would otherwise be performed by the GPU. The adaptations that may be made to the GPU are part of the discussion. When the discussion entails both the GPU and its coprocessor, it will refer to these as the graphics unit.

In the embodiments here, the graphics unit and display processor have two modes to cooperate in reconstructing frames. In an inter frame mode, the graphics unit and display processor interpolate between two previously rendered frames. In a forward extrapolation mode, the display processor extrapolates the current frame from the previous frame and then the graphics unit fills any holes. The extrapolation method has the advantage of less frame buffer requirements and having no additional latency, but the design of the GPU coprocessor is more complicated. Again, one should note that the embodiments do not require a GPU coprocessor.

Figure 1:
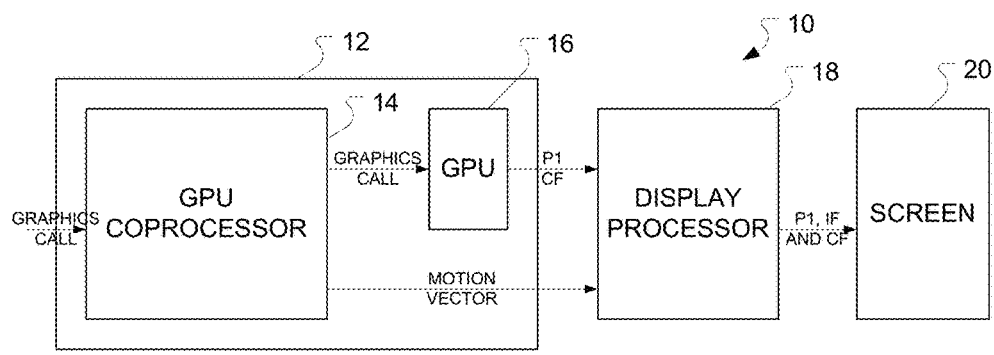
FIG. 1 shows a block diagram of one embodiment of a display unit.

FIG. 1 shows a block diagram of a display system 10 having a graphics unit 12, which may consist of a GPU coprocessor 14 and a GPU 16 or a GPU modified as discussed below. In this embodiment, the graphics call is received by the graphics unit 12. A 'graphics call' may consist of a call generated through an application programming interface (API) such as OpenGL (Open Graphics Library), however OpenGL is merely one example of an API that interacts with the GPU or graphics unit to define 2D and 3D images. A 'call' is merely a request to the graphics unit to render data.

Upon reception of the call, the graphics unit, in this embodiment the graphics coprocessor, intercepts the call and uses it to generate motion vectors for the display processor using the existing functions of the GPU to generate the current frame (CF) and the previous frame (P1) to the current frame in time. In the mode of FIG. 1, in which the display processor performs intraframe interpolation, the display processor generates an interpolated frame (IF) in between CF and P1 in time, using the motion vectors. An issue that arises, however, lies in the fact that the data is for 3D rendering and the system will be rendering in 2D. The motion vectors need to be provided in 2D.

While a separate GPU coprocessor is shown in the figure, an alternative method would be to modify the GPU hardware itself to perform the calculations required besides rendering the scene. This would save cost and power as many of the same calculations are required for both the rendering of the scene and the calculation of the motion vectors.

Figure 2:
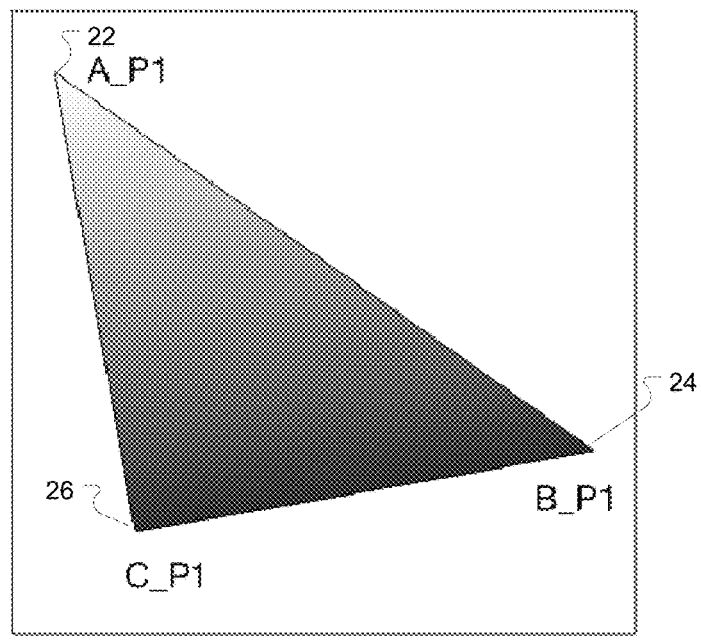
FIG. 2 shows a graphical representation of a triangle in a previous frame of image data.
Figure 3:
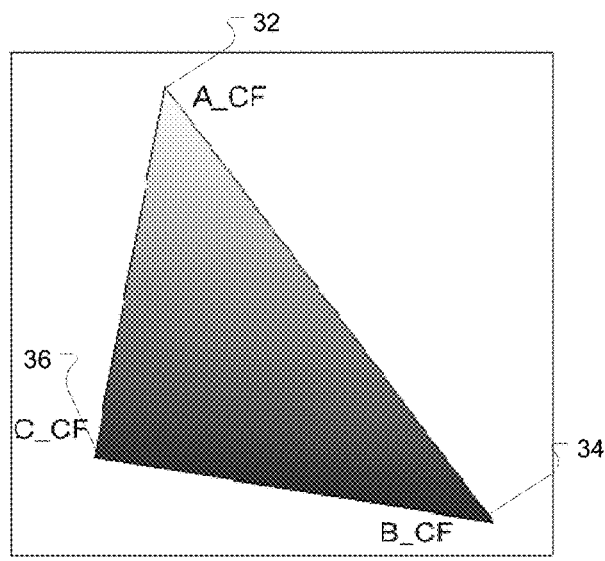
FIG. 3 shows a graphical representation of a triangle in a current frame of image data.
Figure 4:
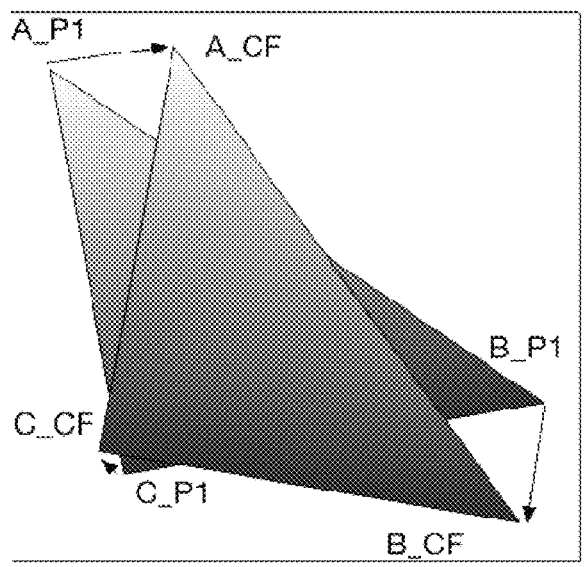
FIG. 4 shows a graphical representation of motion between two frames of image data.

For example, FIG. 2 shows the triangle in P1, having vertices A_P1 22, B_P1 24, and C_P1 26. This triangle can translate, rotate and scale in any direction, meaning that no restrictions exist on the type of motion. FIG. 3 shows the triangle in CF, having vertices A_CF 32, B_CF 34, and C_CF 36. The coordinates of each vertex can be denoted by (x_p1, y_p1, z_p1) and (x_cf, y_cf, z_cf). One should note that although the 3D object has been mapped to a 2D coordinate system, the z component is still necessary for a depth test used later in the process. This is because only pixels that pass the depth test are shown on the screen. FIG. 4 shows a comparison of the triangle in the two different frames.

The motion vector, in three dimensions is:

$$MV=(x\_cf-x\_p1, y\_cf-y\_p1, z\_cf-z\_p1).$$

The vertex position in the frame IF then becomes:

$$\text{Vertex\_IF}=(x\_p1+\text{ratio}*MVx, y\_p1+\text{ratio}*MVy, z\_p1+\text{ratio}*MVz)$$

The ratio is the distance between P1 and CF at which IF resides. For example, if the interpolated frame is the linear midpoint of P1 and CF, then the ratio is 0.5.

Figure 5:
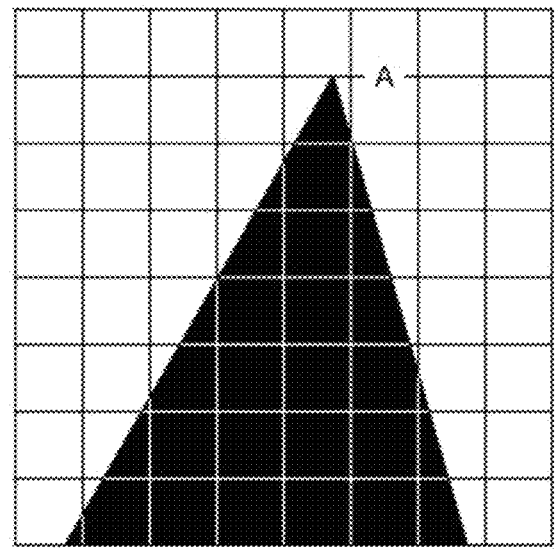
FIG. 5 shows a graphical representation of the triangle image in block format.

One should note that the motion vector for the IF frame is first associated with a vertex in the IF frame. The process can then rasterize the motion vector attributes for the vertices to the screen, in a similar manner as the color attribute. The process treats the motion vector as another attribute of the vertex, similar to color, and rasterizes the triangle base on macro blocks, for example 8×8, in the interpolated frame, shown in FIG. 5. The process then linearly interpolates the motion vector along every block inside the triangle.

Figure 6:
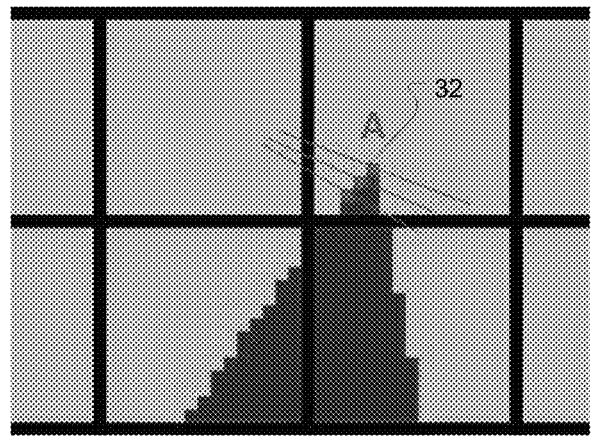
FIG. 6 shows a representation of rasterizing along one edge on a pixel level basis.
Figure 7:
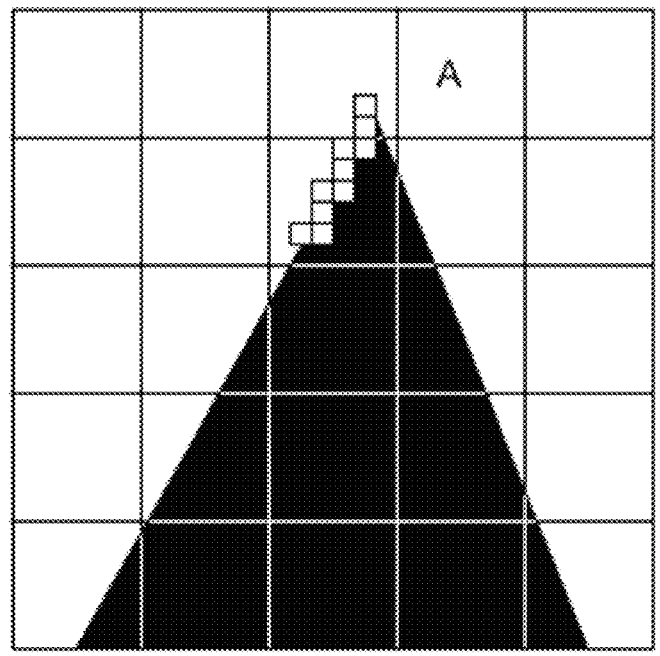
FIG. 7 shows a pixel from the rasterizing process and its neighbors.

One way to rasterize the triangle would be to rasterize each pixel and then calculate the mean of the attribute of those pixels inside that block and take that as the attribute of that block. However, this would require processing as many pixels as simply rendering the frame the traditional manner would require. FIG. 6 shows rasterizing along one edge on a pixel level basis, wherein each element such as 32 is a single pixel. FIG. 7 shows that pixel and its neighbors.

Figure 8:
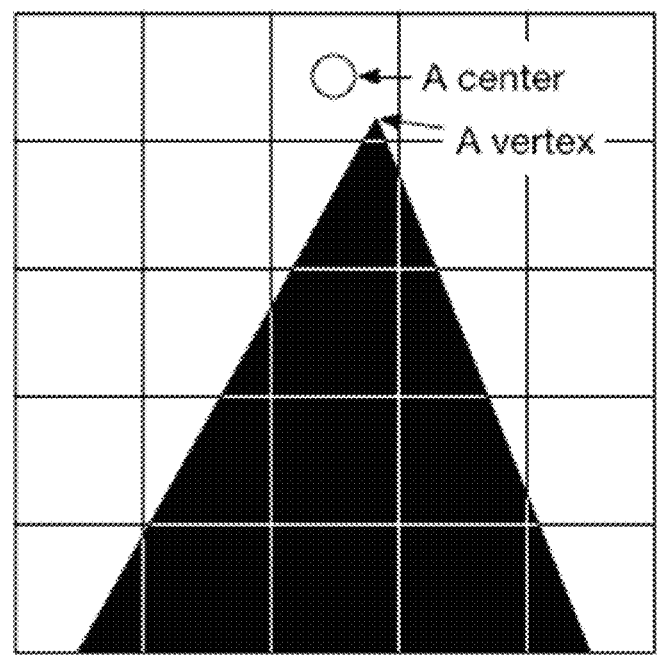
FIG. 8 shows a representation of the center of a block relative to a vertex.

Instead, rasterizing at the block level reduces the number of calculations requires. For example, using a block of 8×8 pixels means only $\frac{1}{64}^{th}$ of the calculations are required. In order to rasterize at the block level, the process first calculates the attribute of the block where vertex A resides, the attribute being the center of the block, A_center, shown in FIG. 8.

Figure 9:
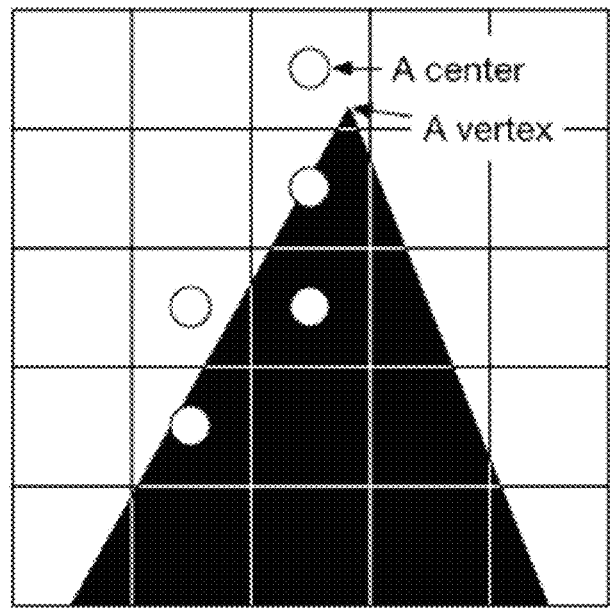
FIG. 9 shows a rasterization of a triangle on a block level.

The motion vector, in three dimensions is MV=(x_cf-x_p1, y_cf-y_p1, z_cf-z_p1). Therefore, it is necessary to interpolate the attribute from vertex A to A_center. For vertex A, denote its attribute by A_attrib, to calculate the attribute on A_center, A_center_attrib, the B vertex and its attribute are needed to linearly interpolate between vertex A and B, to get A_center_attrib_by_B. Likewise the C vertex and its attribute are needed to linearly interpolate between vertex A and C, to get A_center_attrib_by_C. Finally, A_center_attrib=(A_center_attrib_by_B+A_center_attrib_by_C)/2.0. This is used to rasterize the triangle on the block level. FIG. 9 shows this rasterization, with only 5 blocks are marked.

Even though a block may consist of more than one object, the correct motion vector to save for the frame interpolation process is the foreground object's motion vector. This is because one of the neighboring blocks more than likely contains the motion vector for the background objects in the block. Because both motion vector and depth attributes are calculated at the block level, one only needs to determine which motion vector is closest to the eye for each block to determine the correct motion vector for the display processor.

Only visible blocks in the IF frames are used. Furthermore, there are no guarantees that the same vertex for both the CF and P1 frames will be the closest to the eye. The blocks in CF and P1 are pointed to using the MV in the IF frame. If the block in P1 wins the depth test in P1, take the P1 block as the source when reconstructing the frame, otherwise take the CF block as the source when reconstructing.

Figure 10:
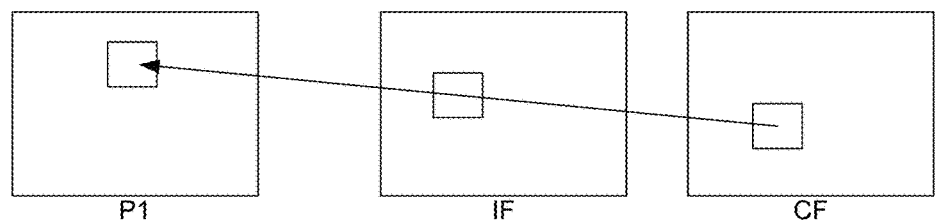
FIG. 10 shows a graphical representation of a moving block in P1, IF and CF frame.
Figure 11:
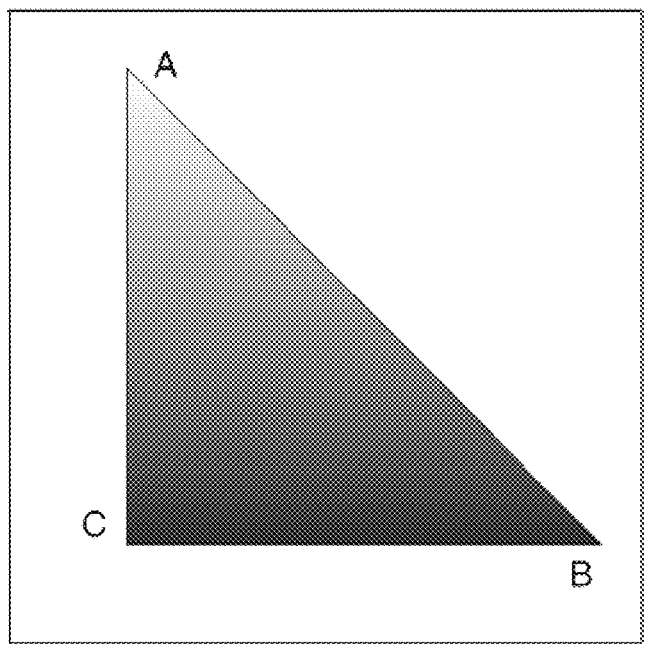
FIG. 11 shows a result from a process of creating a new frame.

FIG. 10 shows a graphical representation of this process. When interpolating a new frame IF, if the block shown wins the depth test in the P1, the process chooses this block as the source for IF. In the new frame IF, only blocks are shown are those blocks win the depth test. When interpolating IF, if that block wins the depth test in CF, choose that block as the source. FIG. 11 shows a result of this creation of a new frame.

This approach has several advantages. For example, GPU is offloaded at the point of interpolating the frames. This is a major advantage of current approaches over the previous optimization approaches. However, the approach includes at least one frame delay, and requires two full frame buffers. Lighting and shadow, alpha blend/test, etc. typically employed in 3D applications are not supported in this mode. The GPU needs additional software or modified hardware to provide some of the data, like rasterizing motion vectors based on macro blocks.

Figure 12:
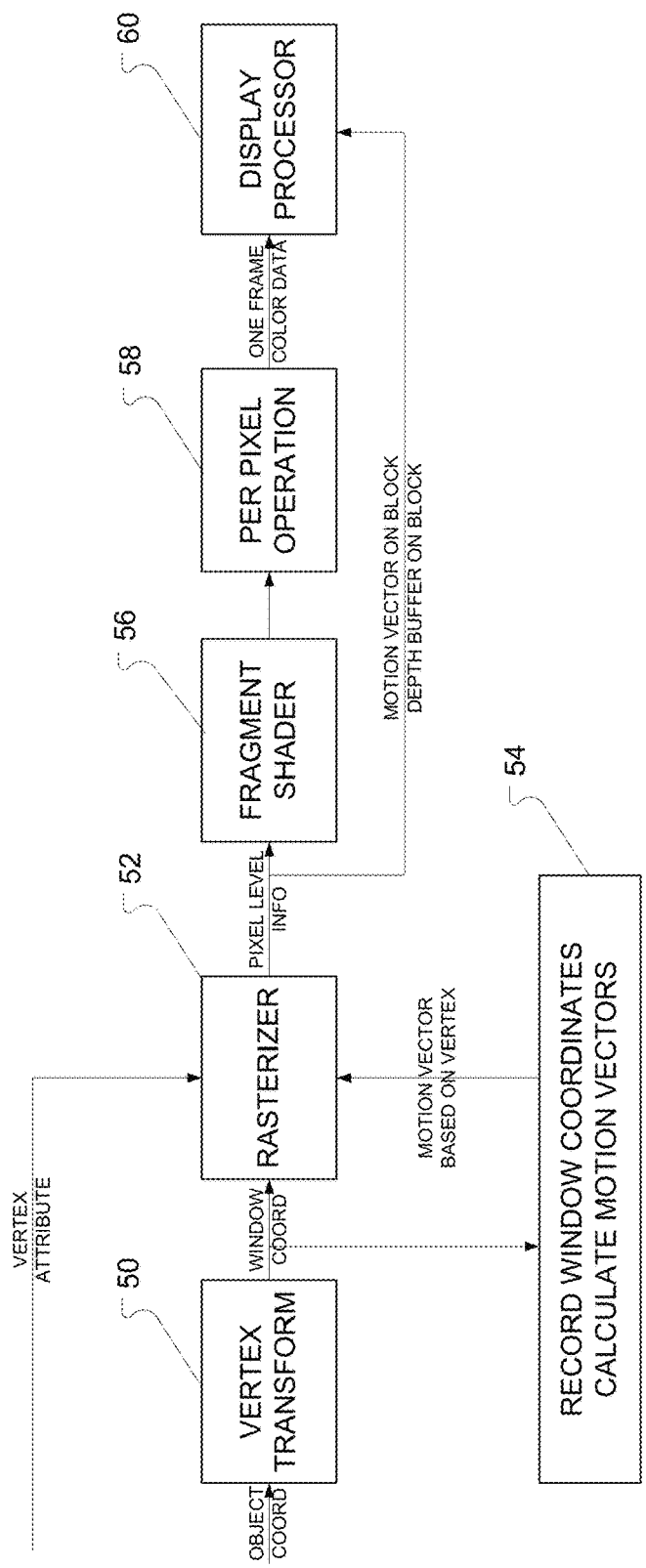
FIG. 12 shows an embodiment of a system architecture.

FIG. 12 shows one embodiment of change to the GPU hardware. The GPU hardware has a new step of calculating the motion vectors. Previous to the embodiments here, the vertex transform 50 receives the coordinates of the object being rasterized and the motion vectors are provided to the fragment shader 56. The per pixel operation 58 then passes the information to the display processor 60. In the adjustments of FIG. 12, the motion vectors and the depth buffers are done per block, rather than in the per pixel operation. This will require that the motion vector that corresponds to the closest object in a block needs to be determined based on the depth buffer. One should note that, if the GPU is modified in this way, the GPU coprocessor mentioned before is not necessary.

Figure 13:
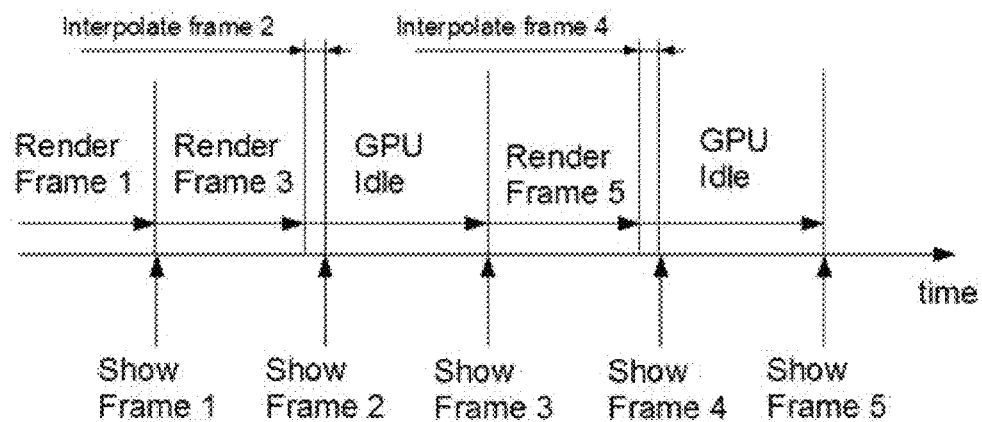
FIGS. 13-20 show graphical representations of processes rendering frames.
Figure 14:
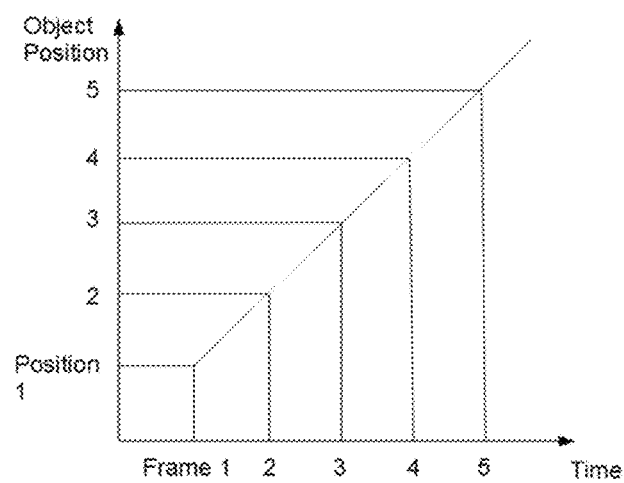

When the time delay is not critical, for example 60 fps→120 fps or when immediate user feedback is not required, the application can decide to render only odd frames, leaving the even frames to be interpolated by the display processor, as shown by FIG. 13. If time delay is critical, but the application finds out that there is unsmooth motion. For example, under ideal condition, GPU renders at a constant speed. The required positions of the objects to be rendered are shown as the dotted line in the FIG. 14.

Figure 15:
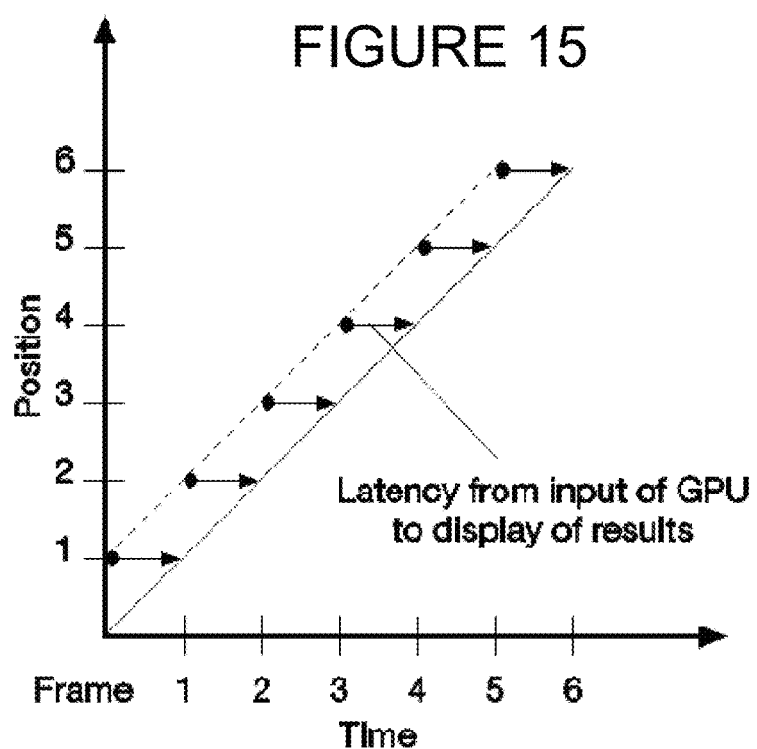
Figure 16:
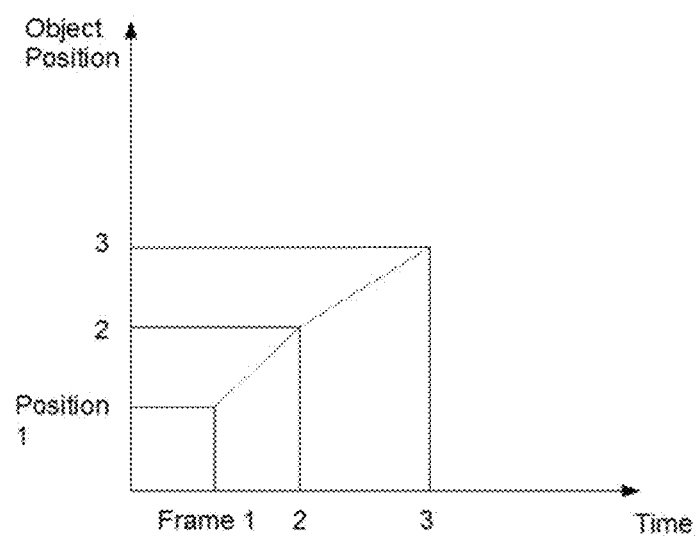
Figure 17:
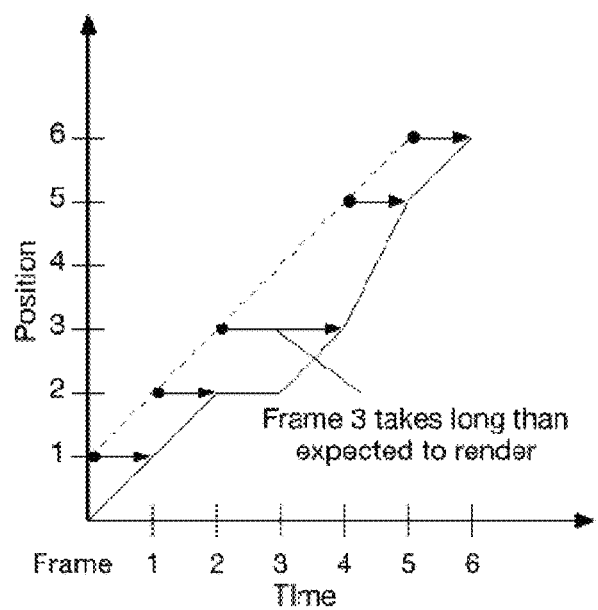

The normal amount of latency is one frame as the GPU renders the new content, as shown in FIG. 15. For example, at the end of rendering frame 1, the GPU has as an input position 2. During the next frame time, it renders the scene according to position 2 and then displays it starting at time 2. Sometimes the rendering of some frames is more complex and therefore may take more time than others. For example, in FIG. 16, frame 3 takes longer than the expected amount of time. The latency is shown in FIG. 17.

Figure 18:
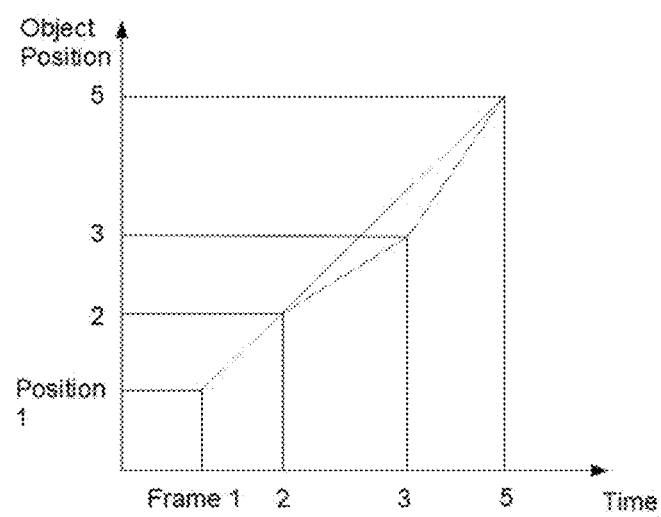

Jank, the stuttering or unresponsive behavior of a device when rendering takes too long, happens on frame 3. To avoid jank happening again on the next frame, the application could adjust the object's position at next frame. That is, it could choose to skip frame 4 and render frame 5 instead, skipping frame 4 and using frame 5's position as the target position, according to the expected time cost as shown, as shown in FIG. 18.

Figure 19:
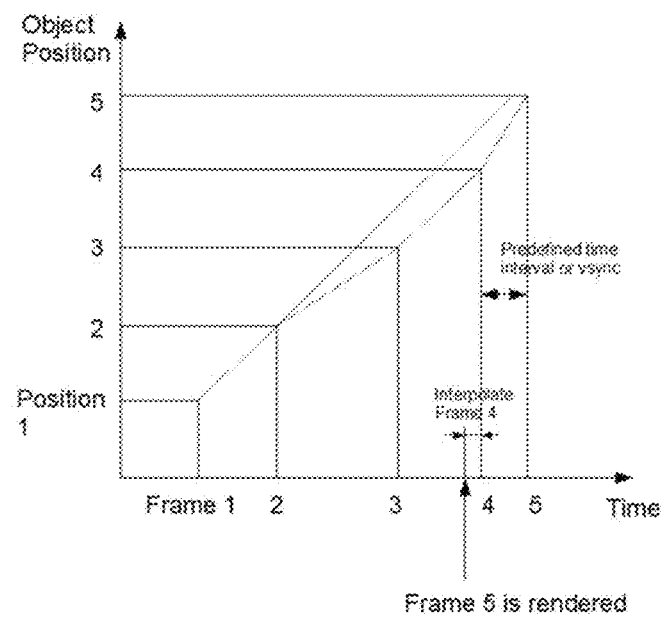
Figure 20:
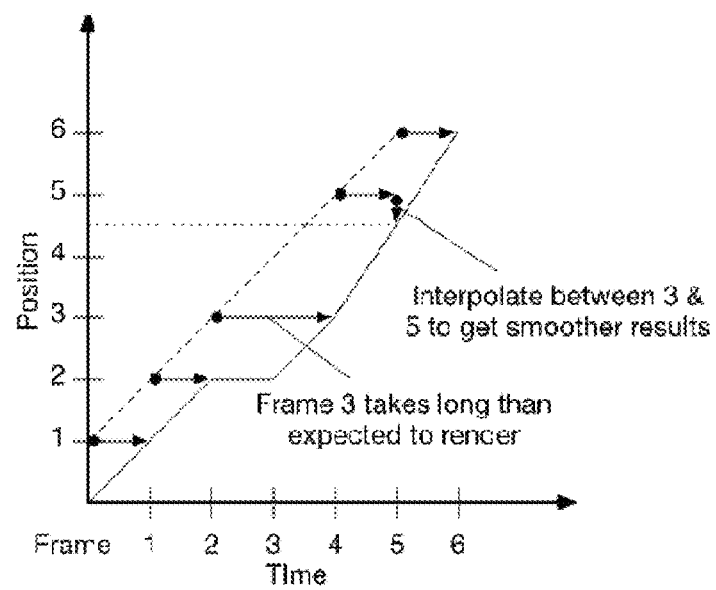

In this way, when the object moves from position 3 to position 5, the step is too big. As shown in FIG. 19, however, with the help of 'inter frame interpolation' mode, the change in position from frame 3 to 5 can be reduced, although the jank on frame 3 is not fixed. That is, in detail, after frame 3, the application finds out that frame 3 took too much time as shown in FIG. 20. Therefore, it could decide to render frame 5, and have the display processor interpolate between frames 3 and 5 to smooth out the recovery from the jank. This could be accomplished, for example, by using a customized graphics call extension. The display processor would slowly remove the extra delay over several frames so that the user doesn't notice the change. After frame 5, if application finds out there is still too much latency to recover in one frame, it could decide to do that again by interpolating between frames 5 and 6.

The above discussion is for the embodiment in which the graphics unit and display processor interpolate the frame between two frames. As mentioned above, this is one of two previously mentioned modes of operation. In the other mode, the frame is extrapolated from the previous frame and the GPU fills the holes.

Figure 21:
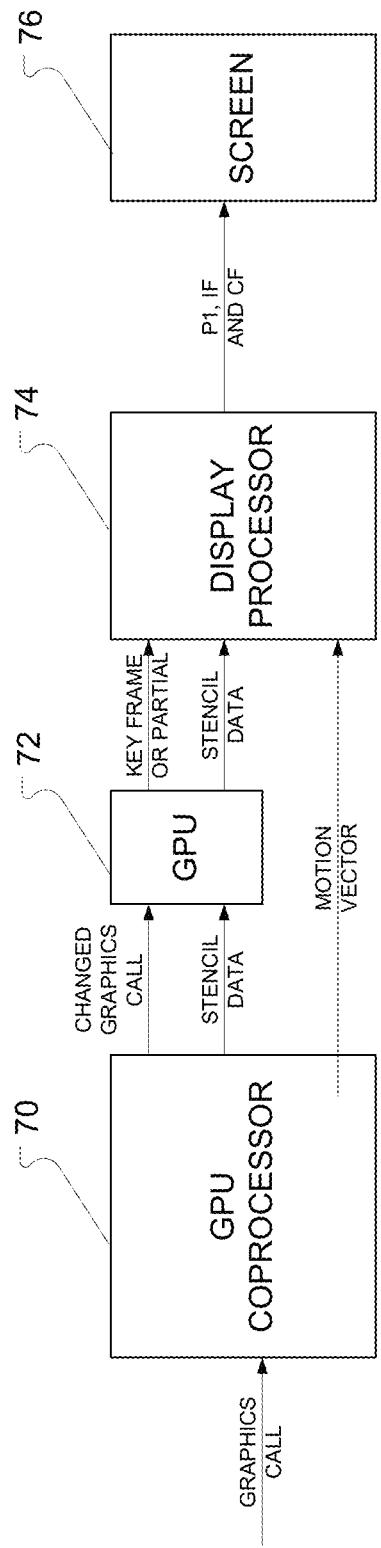
FIGS. 21-22 show an alternative embodiment of a system architecture.

In this mode, shown in FIG. 21, the GPU coprocessor 70 has the GPU 72 render key frames in their entirety while the display processor 74 extrapolates from the previous frame to generate current frames based on the motion vector of the model vertices and sent to the screen 76. For those pixels that the display processor cannot extrapolate from the previous frame, the GPU coprocessor instructs the GPU to render those blocks and marks them in a stencil buffer. The display processor reads the stencil buffer to know which blocks it should not extrapolate. The typical type of content that the display processor is unable of extrapolating to are: uncover regions, lighting effects, shadows and alpha blending. The GPU then transfers the content of the frame buffer to the display processor to fill in the missing pixels.

There is no delay in this solution, and no restriction on 3D applications. In addition, under some conditions, the display processor could extrapolate more than 1 frame, for example, GPU renders frame 1, most likely because of a scene change, frame 2 and 3 or even more are all extrapolated by display processor one by one, as long as the accumulative error of the extrapolation process doesn't lead to an unacceptable loss of position precision This solution has several advantages. For example, this process offloads the GPU on those macro blocks that are extrapolated. Generally speaking, 60%~90% of the blocks are similar or can be described by block based motion vectors to the last frame. There are some disadvantages of this solution. The GPU may require additional software or modified hardware to provide some of the data, like rasterizing motion vectors base on macro block. The modification needed may be a little more complicated than 'inter frame interpolation" mode.

Figure 22:
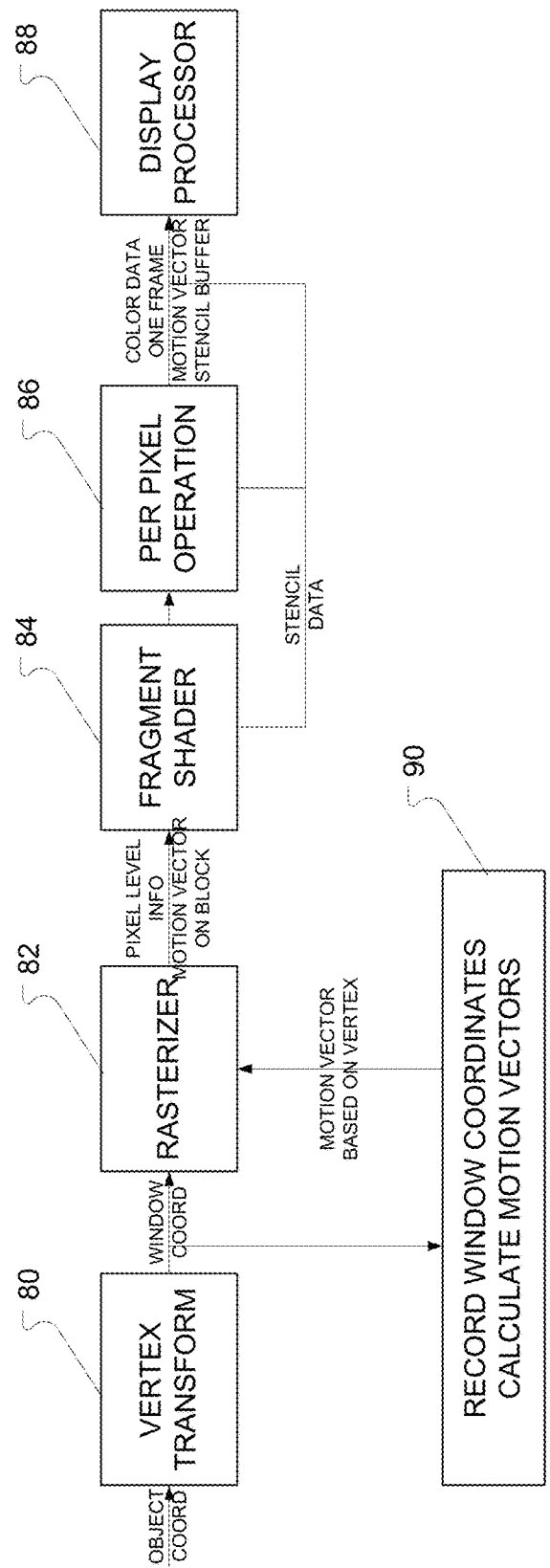
Figure 23:
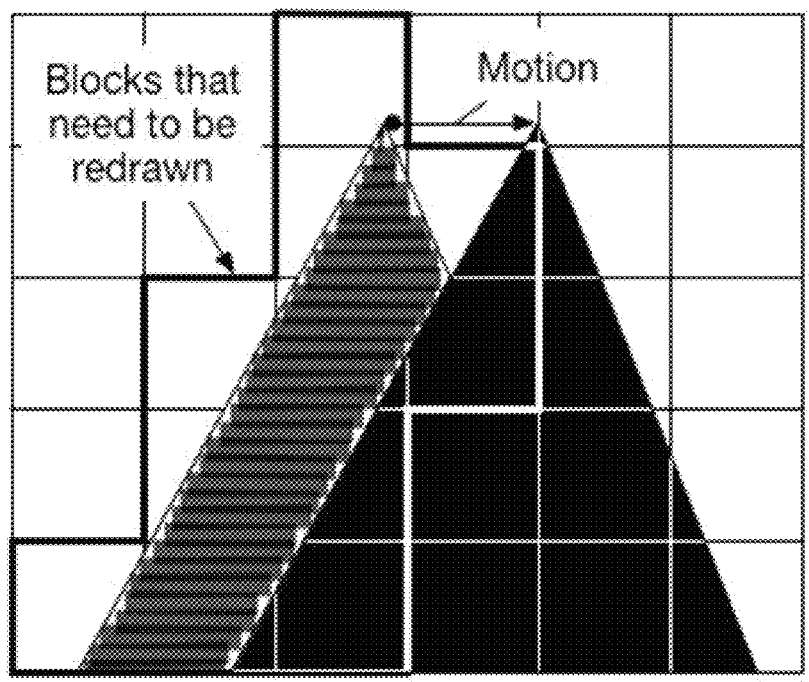
FIG. 23 shows a graphical representation of blocks to be redrawn.

The suggested changes to the GPU hardware are shown in FIG. 22. As in the previous approaches, the vertex transform 80 takes the object coordinates and converts them to the window coordinates at 82. The motion vectors based upon the vertex are provided by the block 90. As in the previous approach, hardware may need to be added, or the software instructions altered, to calculate the motion vectors for each vertex and then to raster the motion vector attributes at the block level. The fragment shader receives the pixel level information and motion vector on the block level. A block needs to be added to detect blocks that the display processor cannot extrapolate from the previous frame. Finally, the stencil data and motion vectors need to be transmitted to the display processor from the fragment shader 84 but around the per pixel operation 86. One should note that if the GPU is modified in this way, the GPU coprocessor is not necessary. FIG. 23 shows blocks that the display processor cannot extrapolate because of motion.

Figure 24:
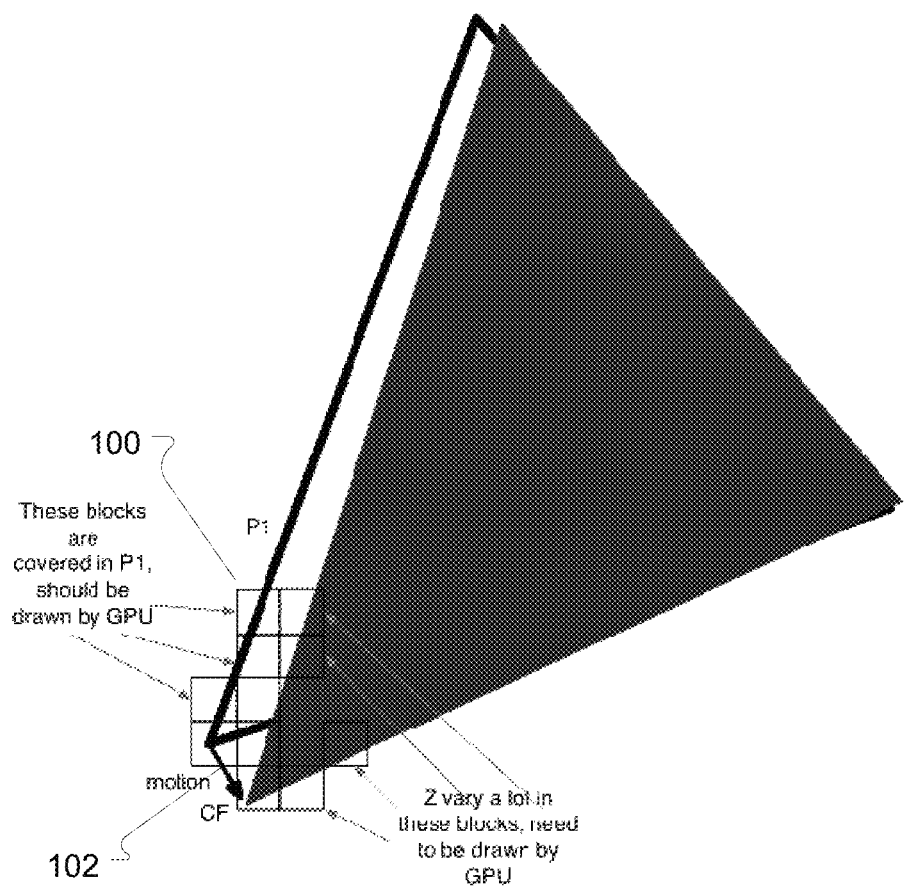
FIG. 24 shows a graphical representation of differences between a triangle in two different frames.

The sketch map of the area around a lower-left vertex of a triangle that translates and rotates is shown on FIG. 24. These blocks, such as 100, are rendered by GPU. The block in P1 pointed to by the motion vector 102 fail the depth test in P1 or it is not clear if this block fails the depth test. This means the block is covered in P1, but uncovered in CF, or the z varies a lot in this block, which makes the z test on block cannot be trusted. One should note that large depth (z) variations usually happens at the border of objects, because these blocks include both foreground and background objects. The display processor can extrapolate all the other blocks. This results in a significant saving of the GPU rendering resources. In either of the above embodiments, significant computational and power savings are gained by off-loading some of the computational tasks to the display processor.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of converting spatial three dimensional model data into two dimensional image data, comprising:
   receiving the spatial three dimensional model data at a display system having a graphics processing unit and a display processor, wherein the display processor has a capability to hold one or two frames of spatial two dimensional image data and utilize motion vectors to reconstruct at least a part of a frame of spatial two dimensional image data;
   identifying at least two vertices of an object to be rendered in a frame of the spatial three dimensional model data;
   calculating a three-dimensional (3D) motion vector for each vertex of the object to be rendered between a first frame and a second frame of the spatial three-dimensional model data;
   determining a position of each vertex in a new frame;
   calculating the motion vectors for a block based upon each vertex position in the new frame and the motion vectors for the vertex, wherein a block is one of a set of rectangular blocks into which image data in the new frame is divided;
   determining a motion vector for a center of a block of pixels, wherein the determining is based on the motion vector for the vertex located in the block, a location of the center of the block of pixels relative to the vertex, and at least one other motion vector for another vertex; and
   using the motion vector for the center of the block to render pixels in the new frame onto a screen.

2. The method of claim 1, further comprising selecting which motion vectors will be used for the block.

3. The method of claim 2, wherein selecting which motion vectors comprises using depth information to select the motion vectors.

4. The method of claim 3, wherein selecting the motion vector comprising selecting a foreground motion vector.

5. The method of claim 1, wherein using the motion vectors to render the pixels comprises interpolating between two frames of previously rendered video frames.

6. The method of claim 5, wherein interpolating between two frames of previously rendered video frames comprises:
    rendering the two frames of previously rendered video frames using the graphics processor; and
    rendering the pixels in the interpolated frame using the display processor.

7. The method of claim 1, wherein using the motion vectors to render the pixels comprises extrapolating a frame of video data from a previously rendered video frame.

8. The method of claim 7, wherein extrapolating the frame of video data comprising:
    extrapolating the frame of video data using the display processor; and
    filling in any missing information using the graphics processor.

9. The method of claim 8, wherein filling in any missing information comprises using a stencil buffer to identify which information is missing.

10. The method of claim 8, wherein the missing information comprises at least one of uncover regions, lighting effects, shadows and alpha blending.

11. The method of claim 1, further comprising calculating a 2D position of the vertices prior to calculating the 3D vertices.

* * * * *